(12) United States Patent
Cui et al.

(10) Patent No.: US 12,185,146 B2
(45) Date of Patent: Dec. 31, 2024

(54) QUALITY BASED MEASUREMENT DEFINITION FOR NEW RADIO SYSTEMS

(71) Applicant: Apple Inc., Cupertino, CA (US)

(72) Inventors: Jie Cui, Santa Clara, CA (US); Yuhan Zhou, Santa Clara, CA (US); Rui Huang, Beijing (CN); Yang Tang, San Jose, CA (US); Hua Li, Beijibng (CN)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 16/637,660

(22) PCT Filed: Aug. 7, 2018

(86) PCT No.: PCT/US2018/045544
§ 371 (c)(1),
(2) Date: Feb. 7, 2020

(87) PCT Pub. No.: WO2019/032539
PCT Pub. Date: Feb. 14, 2019

(65) Prior Publication Data
US 2021/0153049 A1 May 20, 2021

Related U.S. Application Data

(60) Provisional application No. 62/542,699, filed on Aug. 8, 2017.

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04L 5/0048* (2013.01); *H04W 56/001* (2013.01); *H04W 76/27* (2018.02)

(58) Field of Classification Search
CPC . H04W 24/10; H04W 72/005; H04W 72/046; H04W 56/0015; H04W 76/28;
(Continued)

(56) References Cited

U.S. PATENT DOCUMENTS 11,064,365 B2 * 7/2021 Kim ................... H04L 27/2657
2016/0105817 A1   4/2016 Frenne et al.
(Continued)

FOREIGN PATENT DOCUMENTS

CN   101420746 A   4/2009
CN   104160670 A   11/2014
(Continued)

OTHER PUBLICATIONS

International Search Report and Written Opinion of the International Searching Authority directed to related International Patent Application No. PCT/US2018/045544, mailed Jan. 10, 2018; 10 pages.
(Continued)

*Primary Examiner* — Yee F Lam
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for quality-based measurements in new radio (NR). The measurements concern reference signal received quality (RSRQ) measurements and pertinent received signal strength indicator (RSSI) measurements, and signal-to-noise and interference measurements of synchronization signal (SS-SINR) in NR. Various embodiments describe how to measure the pertinent power levels in time domain and frequency domain. Other embodiments may be described and claimed.

3 Claims, 7 Drawing Sheets

(51) Int. Cl.
   *H04L 5/00* (2006.01)
   *H04W 56/00* (2009.01)
   *H04W 76/27* (2018.01)

(58) Field of Classification Search
   CPC .......... H04W 36/0058; H04W 56/001; H04W 36/0088; H04W 76/27; H04B 7/0871; H04B 7/0617; H04B 7/088; H04B 17/318; H04L 5/0048
   See application file for complete search history.

(56) References Cited

U.S. PATENT DOCUMENTS

| | | | |
|---|---|---|---|
| 2016/0112173 A1 | 4/2016 | Wang et al. | |
| 2016/0381592 A1 | 12/2016 | Nguyen et al. | |
| 2017/0126300 A1 | 5/2017 | Park et al. | |
| 2017/0201898 A1 | 7/2017 | Park et al. | |
| 2018/0084593 A1* | 3/2018 | Chen | H04L 5/0048 |
| 2018/0213569 A1 | 7/2018 | Guan et al. | |
| 2018/0262313 A1* | 9/2018 | Nam | H04L 5/0044 |
| 2018/0270772 A1* | 9/2018 | Ly | H04L 5/0092 |
| 2018/0323923 A1 | 11/2018 | Wang et al. | |
| 2019/0081714 A1* | 3/2019 | Xiang | H04W 24/10 |
| 2019/0200249 A1* | 6/2019 | Yoon | H04L 5/0057 |
| 2019/0200306 A1* | 6/2019 | Ko | H04B 7/0617 |
| 2019/0349960 A1* | 11/2019 | Li | H04L 1/1812 |
| 2019/0364452 A1* | 11/2019 | Hwang | H04B 17/318 |
| 2020/0014523 A1* | 1/2020 | Huang | H04W 4/80 |
| 2020/0059810 A1* | 2/2020 | Harada | H04W 56/0005 |
| 2020/0100131 A1* | 3/2020 | Yang | H04W 36/0069 |
| 2020/0119800 A1* | 4/2020 | Rune | H04W 24/10 |
| 2020/0120526 A1* | 4/2020 | Da Silva | H04B 7/0695 |
| 2020/0145854 A1* | 5/2020 | Harada | H04W 24/08 |
| 2020/0145981 A1* | 5/2020 | Harada | H04L 5/0025 |
| 2020/0154296 A1* | 5/2020 | Siomina | H04L 5/0091 |
| 2021/0144601 A1* | 5/2021 | Kazmi | H04W 36/0058 |

FOREIGN PATENT DOCUMENTS

| | | | | |
|---|---|---|---|---|
| CN | 106465173 A | 2/2017 | | |
| CN | 106658584 A | 5/2017 | | |
| CN | 106900175 B | 7/2017 | | |
| WO | WO 2013130886 A1 | 9/2013 | | |
| WO | WO-2018212692 A1 * | 11/2018 | ........ | H04W 72/1289 |
| WO | WO-2018236256 A1 * | 12/2018 | .......... | H04W 56/001 |

OTHER PUBLICATIONS

International Preliminary Report on Patentability directed to related International Patent Application No. PCT/US20218/045544, issued Feb. 11, 2020; 8 pages.

AT&T, "RRM Measurements for NR," R1-1704334, 3GPP TSG RAN WG1 Meeting #88bis, Spokane, USA, Mar. 25, 2017; 2 pages.

Intel Corporation, "Measurement framework in NR," R2-1703420 3GPP TSG RAN WG2 Meeting #97bis, Spokane, USA, Apr. 3, 2017; 3 pages.

Mediatek Inc., "Report of email discussion [98#33][NR/Measurement configuration]," R2-1706570, 3GPP TSG-RAN WG2 NR#2, Qingdao, China, Jun. 26, 2017; 19 pages.

Ericsson, "Further Analysis of Signal Quality Measurement for Mobility in NR," R4-1706840, 3GPP TSG RAN WG4 Meeting NR # 2, Qingdao, China, Jun. 26, 2017; 5 pages.

Huawei, "TP to TR 37.843—Blocking," R4-170443, 3GPP TSG-RAN WG4 Meeting #82bis Spokane, USA, Apr. 13, 2017; 4 pages.

Yang et al., "Research on OFDM Technology in IEEE 802.16 Standard," China Radio, Academic Journal Publishing House, Feb. 26, 2005; 9 pages.

Samsung, Huawei, HiSilicon, "Remaining issues on NR CSI-RS," R1-1707981, 3GPP TSG RAN WG1 Meeting #89, Hangzhou, China, May 15, 2017; 15 pages.

\* cited by examiner

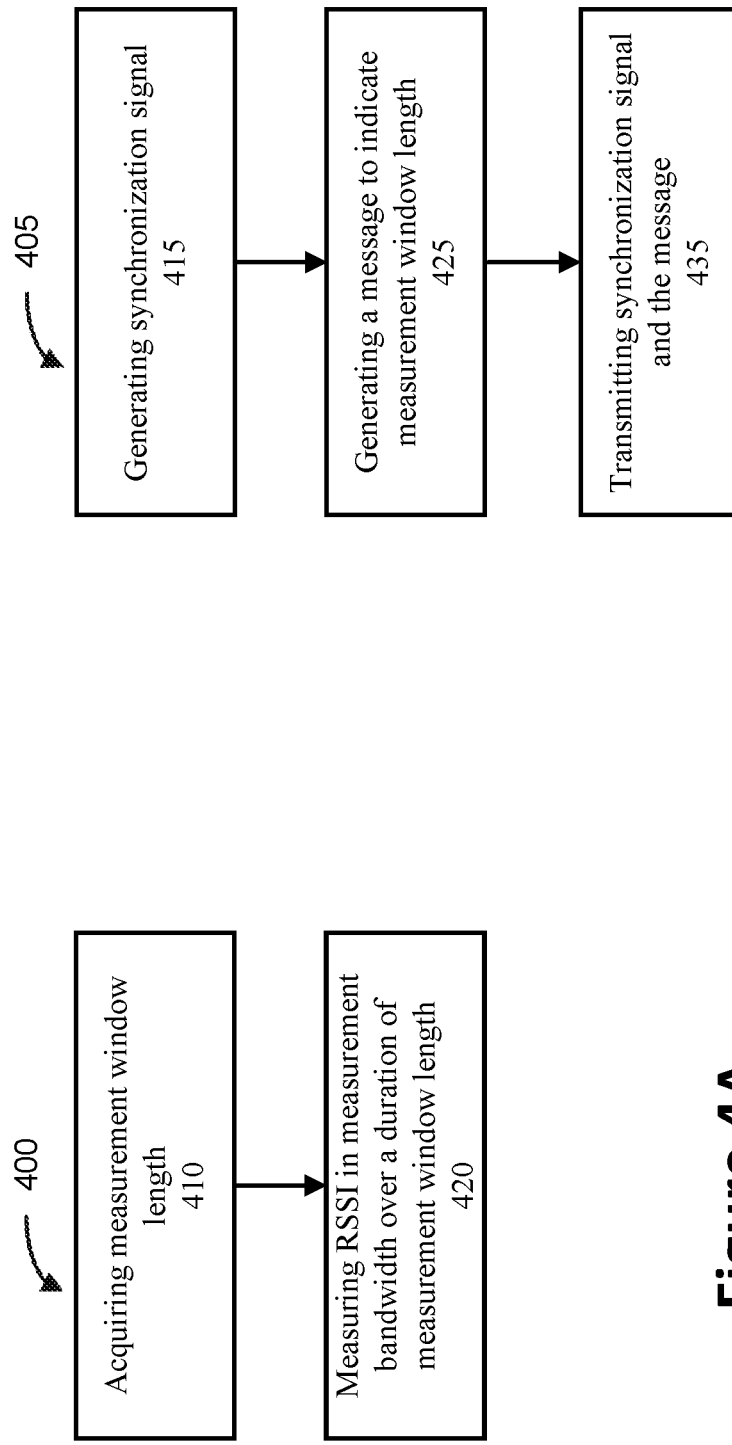

ly based on quality-based measurements, for example, RSRQ, in new radio (NR) systems.

QUALITY BASED MEASUREMENT DEFINITION FOR NEW RADIO SYSTEMS

CROSS REFERENCE TO RELATED APPLICATION

The present application claims priority to U.S. Provisional Patent Application No. 62/542,699, filed Aug. 8, 2017, entitled "New quality based measurement definition for new radio systems," the entire disclosure of which is hereby incorporated by reference in its entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Existing quality-based measurements may not be adequate in developing wireless networks. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4A illustrates an operation flow/algorithmic structure to facilitate a process of optionality received signal strength indicator (RSSI) measurements by a UE in accordance with some embodiments. FIG. 4B illustrates an operation flow/algorithmic structure to facilitate the process by an access node (AN) in accordance with some embodiments.

DETAILED DESCRIPTION

Figure 1:
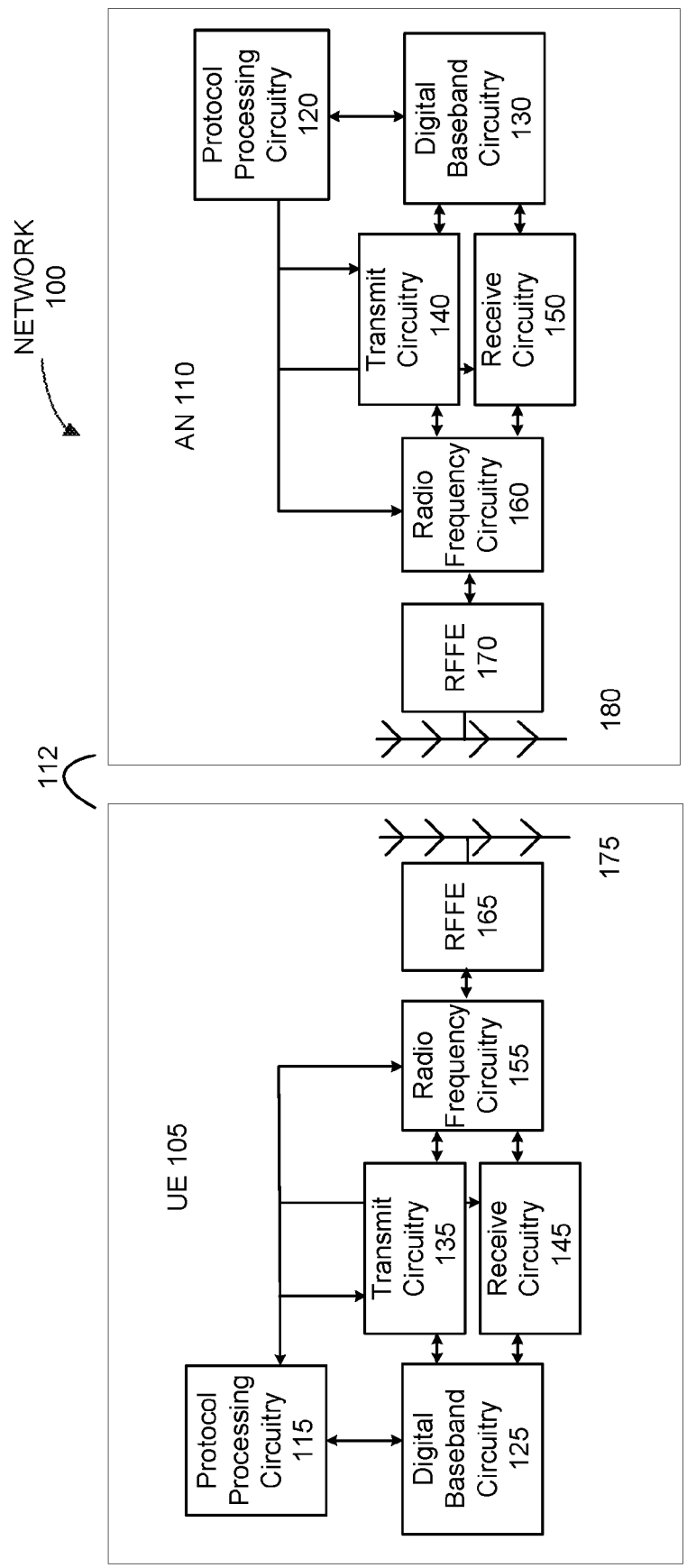
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

In Long Term Evolution (LTE) communications, reference signal received quality (RSRQ) is used as one of the quality-based measurements to measure the quality of a received reference signal of a cell for a UE in a network. RSRQ indicates a ratio of reference signal received power (RSRP) to RSSI. RSSI measures power from all sources within the measurement bandwidth, including signals of a serving cell and non-serving cells, interference, thermal noise, noise generated in the receiver, etc. The measurement time of RSSI is from orthogonal frequency division multiplexing (OFDM) symbols containing reference symbols of measurement subframes. Signal-to-interference and noise ratio (SINR) is another quality-based measurement, which is used to measure the quality of the received reference signal of a cell by the UE as well. SINR indicates a ratio of RSRP to corresponding noise and interference received and generated by the receiver within the measurement bandwidth and time.

Embodiments described herein may include, for example, apparatuses, methods, and storage media for configuring measurements of, or related to, quality-based measurements by a UE in 5G NR communications. RSRQ and SINR are two example measurements for quality-based measurements. The embodiments may apply to other quality-based measurements in NR as well.

FIG. 1 schematically illustrates an example wireless network 100 (hereinafter "network 100") in accordance with various embodiments herein. The network 100 may include a UE 105 in wireless communication with one access node (AN) 110. In some embodiments, the network 100 may be a 5G NR network, a radio access network (RAN) of a third generation partnership project (3GPP) LTE network, such as evolved universal terrestrial radio access network (E-UTRAN), a NextGen RAN (NG RAN), or some other type of RAN. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-mmWave, a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, or any computing device including a wireless communications interface. In some embodiments, the UE 105 can comprise a narrowband Internet of Things (NB-IoT) UE, which can comprise a network access layer designed for low-power NB-IoT applications utilizing short-lived UE connections. An NB-IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved NodeB (eNB), next Generation NodeB (gNB), RAN node, serving cell, and so forth, and can comprise ground stations (for example, terrestrial access points) or satellite stations providing coverage within a geographic area (for example, a cell).

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from any of the RAN nodes, for example, the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

As shown in FIG. 1, the UE 105 may include mmWave/sub-mmWave/microwave communication circuitry grouped according to functions. The circuitry shown here is for illustrative purposes and the UE 105 may include other circuitry not shown here in FIG. 1. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or demapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions. The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
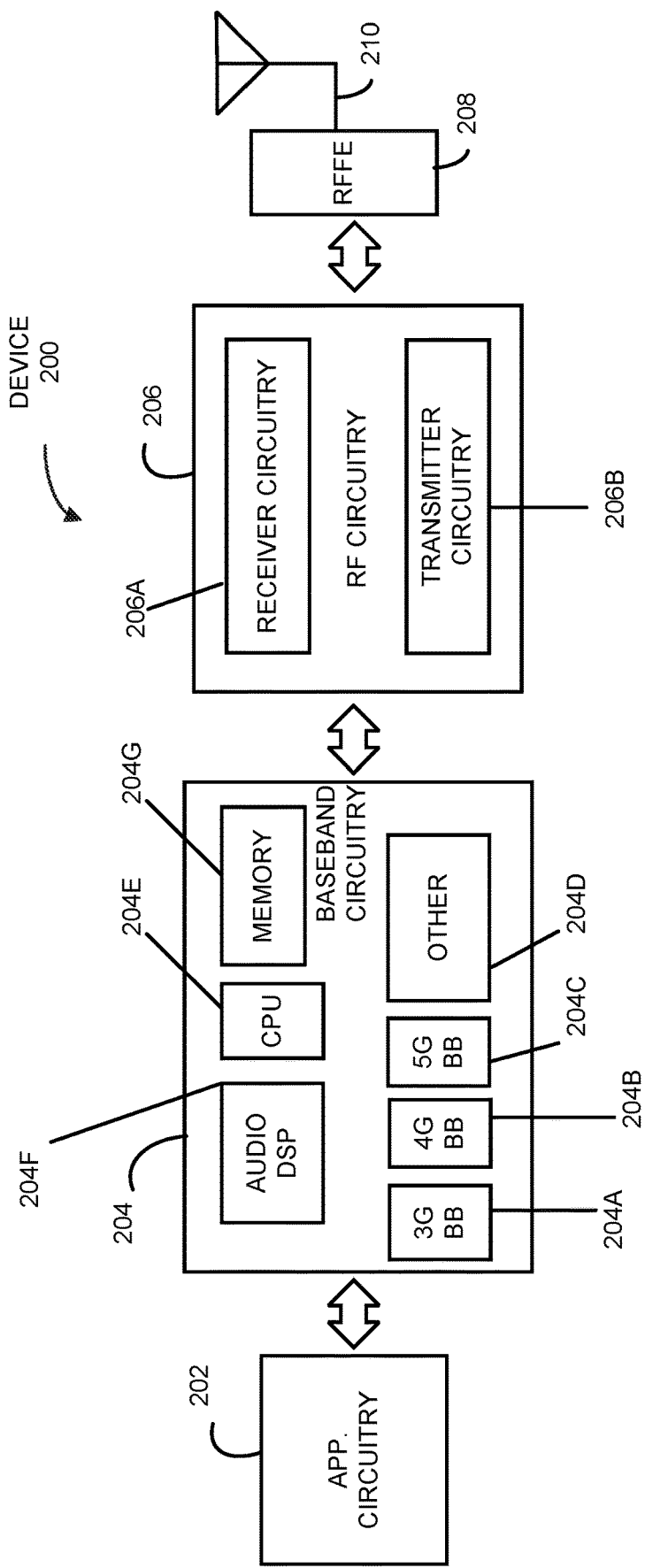
FIG. 2 illustrates example components of a device in accordance with various embodiments.
Figure 6:
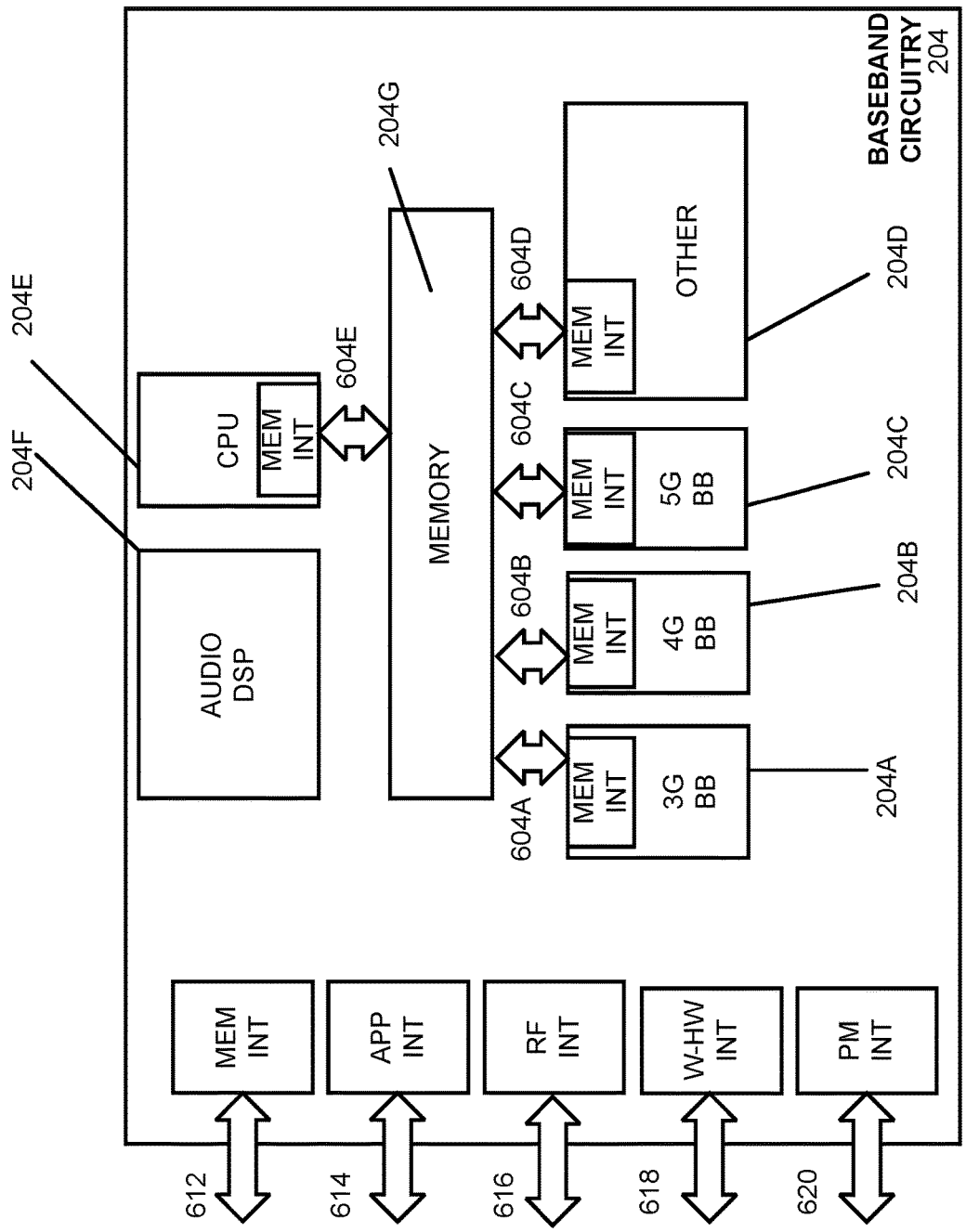
FIG. 6 illustrates example interfaces of baseband circuitry in accordance with some embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. The transmission from the AN 110 may be transmit-beamformed by antennas of the AN 110. Further details regarding the UE 105 architecture are illustrated in FIGS. 2 and 6. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave/microwave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170 and one or more antenna panels 180.

An AN transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam.

FIG. 2 illustrates example components of a device 200 in accordance with some embodiments. In some embodiments, the device 200 may include application circuitry 202, baseband circuitry 204, RF circuitry 206, RFFE circuitry 208, and a plurality of antennas 210 together at least as shown.

The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, an AN may not utilize the application circuitry 202, and instead include a processor/controller to process IP data received from an evolved packet core (EPC)). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/ demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

The RFFE circuitry 208 may include a receive signal path, which may include circuitry configured to operate on RF beams received from one or more antennas 210. The RF beams may be transmit beams formed and transmitted by the AN 110 while operating in mmWave, sub-mmWave, or microwave frequency range. The RFFE circuitry 208 coupled with the one or more antennas 210 may receive the transmit beams and proceed them to the RF circuitry 206 for further processing. The RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

In NR, there may be primary synchronization signals and secondary synchronization signals, both of which may be contained in one or more SS blocks. SS blocks may also contain physical broadcast channel (PBCH) symbols. One or more such SS blocks may constitute an SS burst. One or more SS bursts may constitute an SS burst set. Such an SS burst set may be confined within a 5 millisecond (ms) window and transmitted periodically based on an SS burst set periodicity. Such a periodicity may be, for example, 20 ms. Various embodiments describe details in SS block design as follows.

Figure 3:
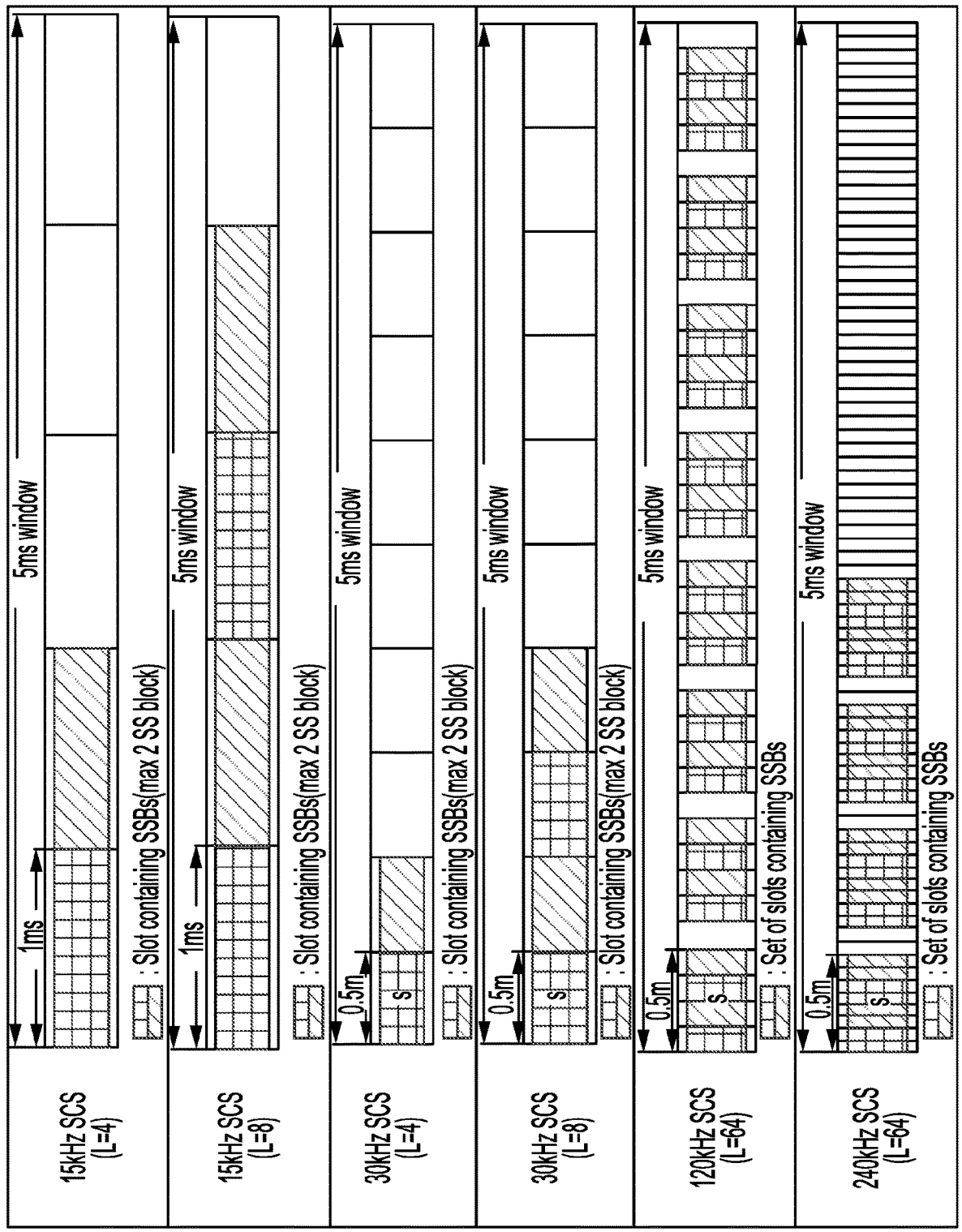
FIG. 3 illustrates an example of synchronization signal (SS) block mapping to slots in a half radio frame with different new radio (NR) numerologies.

FIG. 3 illustrates embodiments of mapping SS blocks to slots in a half radio frame that may correspond to a 5 ms window, for example. NR numerologies allow multiple subcarrier spacings (SCSs). FIG. 3 shows 15 kHz, 30 kHz, 120 kHz, and 240 kHz as examples. L indicates number of possible candidate SS block locations within an SS burst set. Such locations may be related to possible candidate locations in a slot containing SS blocks and operating frequency. The example 5 ms window contains one SS burst set. The SS burst set may be transmitted periodically with an SS burst set periodicity. A radio frame may contain different numbers of slots corresponding to different SCSs. For example, as shown by FIG. 3, a radio frame with a 15 kHz SCS may include five slots, while a radio frame with a 30 kHz SCS may include ten slots. A slot may contain 14 symbols (Symbols 0-13). One SS block may contain four consecutive OFDM symbols carrying synchronization signals. For a 15 kHz SCS, candidate locations of two SS blocks may begin, for example, at Symbols 2-5 for a first candidate location, and at Symbols 8-11 for a second candidate location correspondingly. It is noted that the number of possible candidate locations within an SS burst set is also determined by frequencies that the UE 105 operates. For a 30 kHz SCS, candidate locations of the two SS blocks may be at the same symbols in a slot as for a 15 kHz SCS. Depending on the operation frequencies and slots that may contain SS blocks, such a burst set may contain four or eight possible candidate SS block locations. In the case of NR-LTE coexistence, the above noted SS block mapping pattern may be used as well, and duplex alignment can be achieved by subframe offset. In some embodiments, a Gold sequence may be used as the sequence type. If cross correlation issues are found, other sequences may be considered. Sequence initialization may be from a cell identification, and two or three bits may be from time identification. Various embodiments may use longer sequences, different mapping, or different initialization for different sequences in a number of NR-physical broadcast channel (NR-PBCH) symbols.

In some embodiments, equal demodulation reference signal (DMRS) density may be designed to be across NR-PBCH with three resource elements, physical resource blocks, or symbols, while in relation to SS block design. For example, DMRS may be designed to have the same resource element position in all of the NR-PBCH symbols. In the case of two PBCH symbols within one SS block, Primary synchronization signal (PSS)-PBCH-Secondary synchronization signal (SSS)-PBCH may be used. In some embodiments, with respect to PBCH RE mapping, NR-PBCH coded bits of the NR-PBCH code block(s) may be mapped across resource elements in a number of PBCH symbols in an NR-SS block.

In some embodiments, three bits of an SS block index may be designed to be carried by changing the DMRS sequence within each 5 ms period. It may be further considered to limit the number of bits to two if carrying three bits causes problems. Remaining bits of the timing information may be carried explicitly in an NR-PBCH payload. It is noted that when there is an indication for a carrier, the UE may utilize serving cell timing to derive the index of SS block transmitted by neighbouring cells, for example, radio frames, system frame number (SFN), or symbol level synchronization.

RSRQ may be used for measuring quality of a received reference signal of a cell to indicate receiving quality with respect to a serving cell. In LTE, RSRQ is defined as a ratio of RSRP to RSSI over the same measurement bandwidth and measurement time. RSSI is measured as a linear average over the power contribution in Watt of all the resources including co-channel serving and non-serving cells, adjacent channel interference, thermal noise, etc., received over the measurement bandwidth at each receiver branch. The measurement time of RSSI is determined to be from all OFDM symbols of the downlink part of measurement subframes.

In NR, multiple numerologies are used so that multiple SCSs and subframe structures are available. NR reference symbols may be located consecutively in a slot, which is different from scattered mapping of reference symbols in LTE. Thus, embodiments of the present disclosure describe how to provide adequate RSSI measurements in time domain and frequency domain for 5G NR.

SINR may be additionally or alternatively used for similar purposes in terms of quality-based measurements. For simplicity of the discussion herein, only RSRQ and RSSI are discussed with respect to measurement time and measurement bandwidth. All the descriptions herein apply to other pertinent reference signal (RS) quality-based measurements, such as RS-SINR.

Embodiments described herein provide detailed configurations and operations that may be used to measure RSSI and RS-SINR in time and frequency domains in NR.

FIG. 4A illustrates an operation flow/algorithmic structure 400 to facilitate a process of RSSI measurements by the UE 105 in accordance with some embodiments. The operation flow/algorithmic structure 400 may be performed by the UE 105 or circuitry thereof. For example, in some embodiments the operation flow/algorithmic structure 400 may be implemented by digital baseband circuitry 125.

The operation flow/algorithmic structure 400 may include, at 410, acquiring a measurement window length. The measurement window length may indicate the measurement time or period of an RSSI measurement for the UE 105. In some embodiments, the UE 105 may receive a message that indicates the measurement window length from the AN 110. The measurement window length may be configured by the AN 110 and it may be configured as a number, for example, 5 ms. Further, the message may include information so that the UE 105 may determine the measurement time based on the received information. In some embodiments, the measurement window length may be configured in a measurement-timing configuration, and the message may be transmitted via an RRC by the AN 110.

In some embodiments, the measurement period may be determined based on several factors. Those factors may include a symbol length, number of symbols in an SS block, maximum number of SS blocks, and a maximum measurement time. For example, the measurement period may be calculated based on the below equation:

$$T_{RSSI} = \mathrm{Min}(5\ \mathrm{ms}, 3.5 \times M \times L \times T_{ss\text{-}symbol}), \quad \text{Equation (1)}$$

wherein M is a number of symbols in an SS block; L is a maximum number of SS blocks within an SS burst set; and $T_{ss\text{-}symbol}$ is a duration of a symbol in an SS block. Thus, the measurement time or period of RSSI may be determined as the minimum value between 5 ms and the calculation of $3.5 \times M \times L \times T_{ss\text{-}symbol}$. In alternative embodiments, the measurement window length may be determined based on the above equation.

In some other embodiments, the measurement period of RSSI may begin with the first slot that includes the first SS block in the SS burst set in time.

The operation flow/algorithmic structure 400 may further include, at 420, measuring RSSI in a measurement bandwidth over the duration of the measurement window length, based on the received synchronization signal of the cell and noise and interference. In some embodiments, the UE 105 may receive the synchronization signal of the cell from the AN 110 and noise and interference from the AN 110 and elsewhere. The synchronization signal of the cell may include SS blocks that contain reference signals. The noise and interference may include noise and interference transmitted from the AN 110 and other resources. The interference may include synchronization signals or data signals of neighbouring cells other than the serving cell. The noise may also include the noise generated by the receiver of the UE 105. RSSI measures a total power received by the UE 105 from all the resources within the measurement bandwidth and time.

In some embodiments, the RSSI measurement may calculate a linear average power of the measured total power over the duration of the measurement window length. Thus, all the symbols may be measured in the duration of the measurement window length regardless of whether they are related to synchronization signals. Therefore, the linear power averaging may lower the RSSI measurement results.

In addition, the UE 105 may receive one or more SS bursts, or SS burst sets to measure RSSI.

In some embodiments, the measurement bandwidth of RSSI is the same bandwidth as used for a corresponding RSRP measurement of the synchronization signal, which is part of the RSRQ measurement. The RSRP measurement concerns the resource elements that carry secondary synchronization signals.

FIG. 4B illustrates an operation flow/algorithmic structure 405 to facilitate the process of RSSI measurements by the AN 110 in accordance with some embodiments. The operation flow/algorithmic structure 405 may be performed by the AN 110 or circuitry thereof. For example, in some embodiments the operation flow/algorithmic structure 400 may be implemented by digital baseband circuitry 125.

The operation flow/algorithmic structure 405 may include, at 415, generating at least one synchronization signal of a cell. The synchronization signal of the cell may include reference signals for the UE 105 to conduct quality-based measurements. A number of SS blocks may be mapped consecutively in one slot or more slots. More than one slot may include mapped SS blocks. Details of synchronization signal generation is consistent with SS block design provided above.

The operation flow/algorithmic structure 405 may further include, at 425, generating a message to include a configuration of the measurement window length. The measurement window length may be configured as a value in time, for example, 5 ms. In some embodiments, the measurement window length may be configured in a measurement-timing configuration, and the message may be transmitted via an RRC by the AN 110. The message may indicate additional information, such as the periodicity of the SS burst set for transmission. It is noted that an SS burst set may include multiple SS bursts, and each of the SS bursts may include multiple SS blocks.

The operation flow/algorithmic structure 405 may further include, at 435, transmitting the at least one synchronization signal of the cell and the message to the UE 105 so that the UE 105 may measure RSSI over the duration of the measurement window length, based on reception by the UE 105. In some embodiments, the synchronization signal may include more than one SS block. The SS blocks may constitute an SS burst, and a plurality of SS bursts may constitute an SS burst set. The SS burst set may be transmitted by the AN 110 based on an SS burst set periodicity.

Figure 5A:
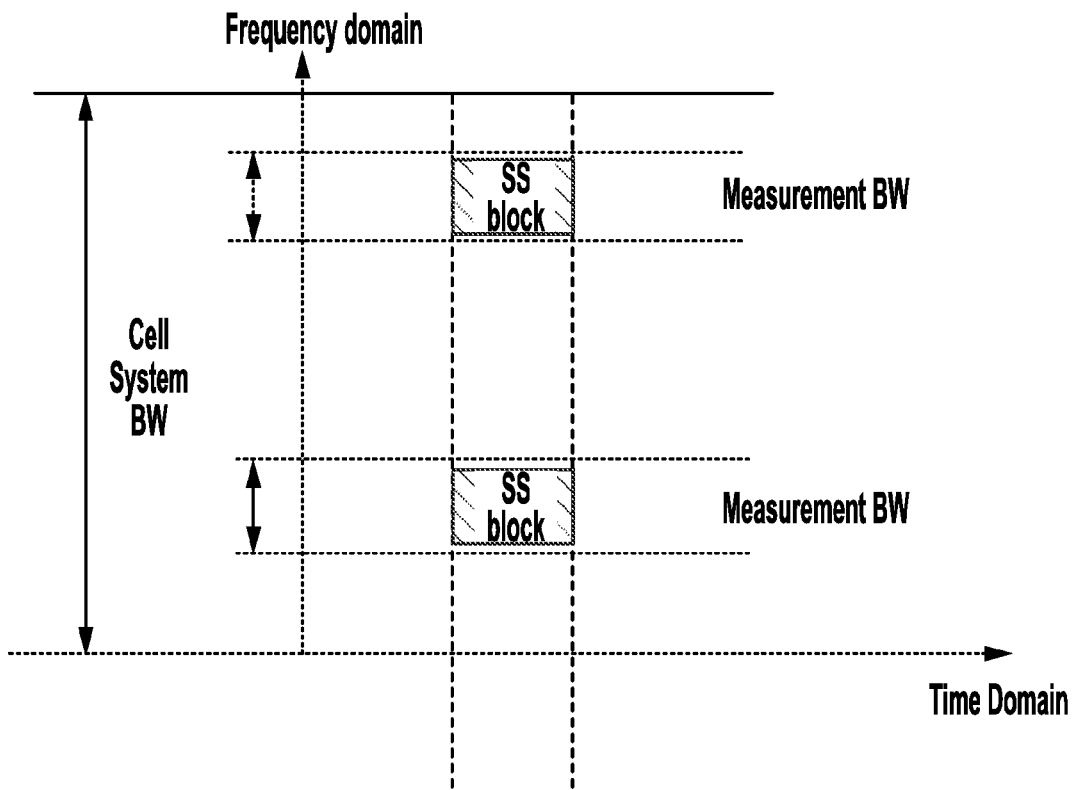
FIG. 5A illustrates an example of two SS blocks (SSBs) distributed in frequency domain and time domain. The two SS blocks occupy two different measurement bandwidths in a system bandwidth in frequency domain and time domain.

In some embodiments, the SS blocks may occupy different frequency ranges in an assigned system bandwidth. FIG. 5A illustrates an example of two SS blocks distributed in frequency domain and time domain. The two SS blocks occupy two different measurement bandwidths in a cell system bandwidth in frequency domain and time domain. RSSI calculation may concern the measured power on all measurement bandwidths in which RSRP of the SS blocks are to be measured, since the RSRP measurement of the SS blocks may average the measured power in frequency domain.

Figure 5B:
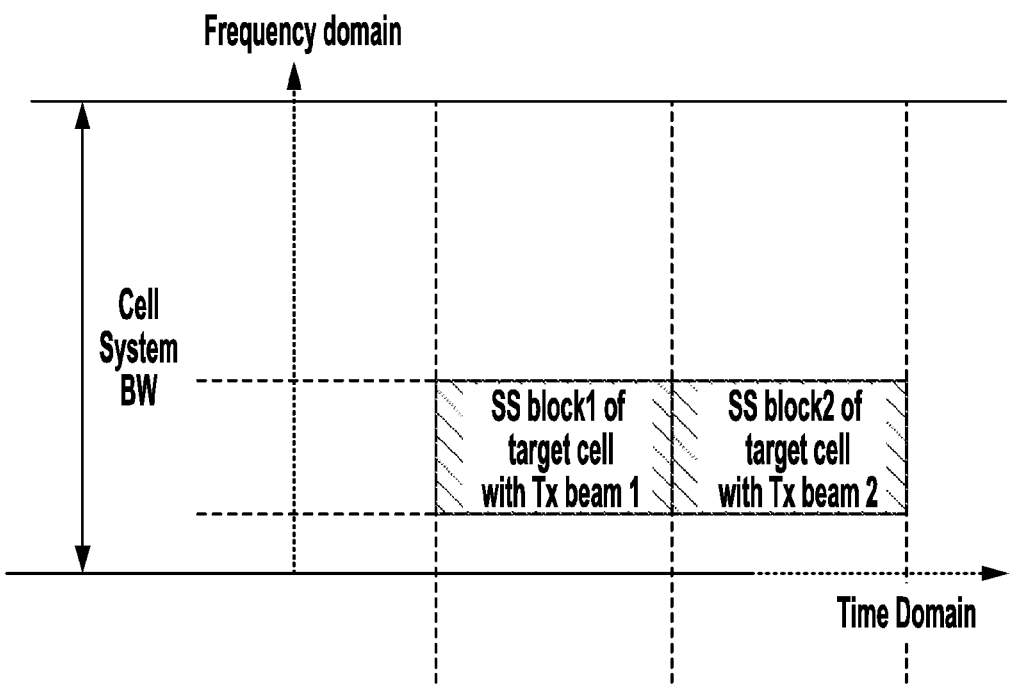
FIG. 5B illustrates an example of two SS blocks transmitted by two different beams.

In some embodiments, SS blocks may be formed into different transmit beams by the AN 110. FIG. 5B illustrates that two SS blocks are formed into two different beams (Tx beam 1 and Tx beam 2) in one SS burst set or one SS burst set periodicity. RSSI measurements may average a linear power based on both measured beams of the SS blocks, regardless of whether the two SS blocks are transmitted by different beams.

In some embodiments, while SS blocks are distributed in a system bandwidth as shown in FIG. 5A, RSSI may calculate an averaged linear power in the system bandwidth.

In some other embodiments, the noise and interference may be measured and calculated in the measurement bandwidth and time based on the resource elements of the SS blocks within the same burst set periodicity and frequency bandwidth. If multiple beams are formed to transmit the SS blocks, all of the beams may be measured and calculated.

SS-SINR is another quality-based measurement. It calculates the wanted synchronization signal divided by all the noise and interference received/generated by the UE receiver in the measurement bandwidth over the measurement time. In SINR measurements, RSRP may be measured for signal calculation in the numerator. By contrast to RSRQ and RSSI, only noise and interference may be measured and calculated in the denominator. However, the above discussed measurement bandwidth and time applications of RSSI apply to the noise and interference measurements of SINR as well. FIG. 6 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 604A-604E, respectively, to send/receive data to/from the memory 204G.

The baseband circuitry 204 may further include one or more interfaces to communicatively couple to other circuitries/devices, such as a memory interface 612 (for example, an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
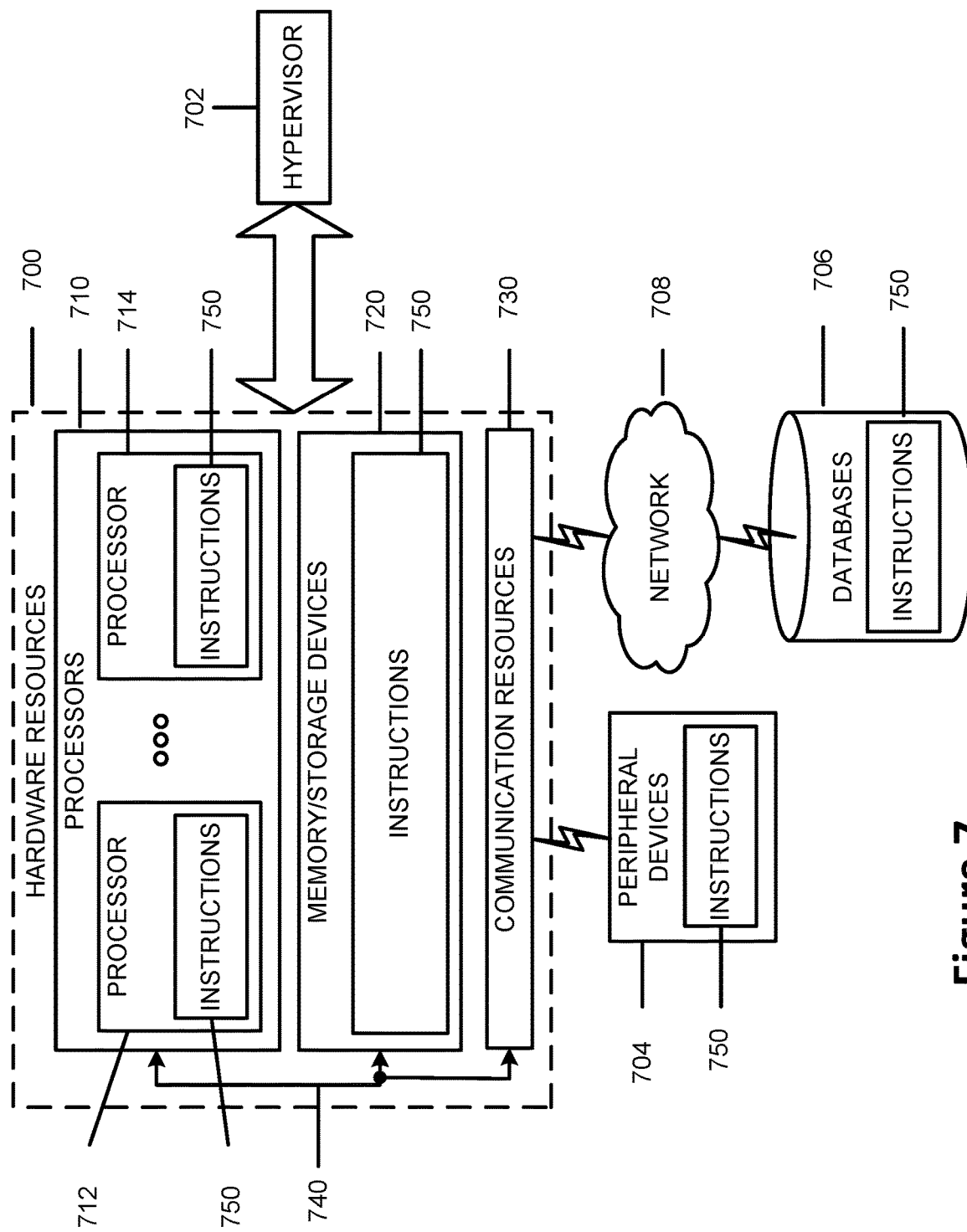
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 105, the instructions 750 may cause the UE to perform some or all of the operation flow/algorithmic structure 400. In other embodiments, the hardware resources 700 may be implemented into the AN 110. The instructions 750 may cause the AN 110 to perform some or all of the operation flow/algorithmic structure 405. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more computer-readable media comprising instructions to, upon execution of the instructions by one or more processors of a UE, cause the UE to: acquire a measurement window length; and measure, based on at least one SS of a cell received by the UE, an RSSI in a measurement bandwidth over a duration of the measurement window length.

Example 2 may include the one or more computer-readable media of example 1 and/or some other example herein, wherein to measure the RSSI, the UE is to: measure, based on the at least one SS of the cell received by the UE, at least one total power of the at least one SS of the cell plus noise and interference in the measurement bandwidth over the duration of the measurement window length; and calculate, based on the at least one measured total power, a linear average power of the at least one measured total power over the duration of the measurement window length.

Example 3 may include the one or more computer-readable media of examples 1-2 and/or some other example herein, wherein the duration of the measurement window length starts at a first slot of a first SS block in an SS burst set, and the first slot has the first SS block as an earliest SS block in the SS burst set.

Example 4 may include the one or more computer-readable media of examples 1-2 and/or some other example herein, wherein the measurement bandwidth is a same bandwidth as used for a corresponding RSRP measurement of the at least one SS to calculate a corresponding RSRQ of the at least one SS.

Example 5 may include the one or more computer-readable media of examples 1-2 and/or some other example herein, wherein the measurement window length is calculated based on $T_{RSSI}=\text{Min}(5\text{ ms}, 3.5\times M\times L\times T_{ss\text{-}symbol})$, further wherein the M is a number of symbols in an SS block, the L is a maximum number of SS blocks in an SS burst set, and the $T_{ss\text{-}symbol}$ is a duration of the symbol.

Example 6 may include the one or more computer-readable media of examples 1-2 and/or some other example herein, wherein the measurement bandwidth includes one or more bandwidths in which corresponding RSRP measurements are performed.

Example 7 may include the one or more computer-readable media of examples 1-2 and/or some other example herein, wherein the at least one SS includes more than one SS block to indicate reference signal information from an AN, and the more than one SS block are to be transmitted by one or more transmit-beams formed by the AN.

Example 8 may include the one or more computer-readable media of examples 1-2 and/or some other example herein, wherein, upon execution, the instructions are to further cause the UE to determine the measurement window length based on a configuration to indicate the measurement window length.

Example 9 may include the one or more computer-readable media of example 8 and/or some other example herein, wherein, upon execution, the instructions are to further cause the UE to receive the configuration to indicate the measurement window length via an RRC by an AN.

Example 10 may include the one or more computer-readable media of examples 1-2 and/or some other example herein, wherein, upon execution, the instructions are to further cause the UE to receive the SS in an SS burst or an SS burst set from an AN.

Example 11 may include one or more computer-readable media comprising instructions to, upon execution of the instructions by one or more processors of an AN, cause the AN to: generate at least one SS of a cell; generate a message to indicate a configuration of a measurement window length; and transmit the at least one SS of the cell and the message so that a UE is to measure an RSSI over a duration of the measurement window length, based on reception by the UE.

Example 12 may include the one or more computer-readable media of example 11 and/or some other example herein, wherein the at least one SS of the cell includes more than one SS block to indicate reference signal information.

Example 13 may include the one or more computer-readable media of example 12 and/or some other example herein, wherein the more than one SS block occupy more than one frequency range.

Example 14 may include the one or more computer-readable media of examples 11-13 and/or some other example herein, wherein the message is further to indicate a periodicity of an SS burst set for transmission, further wherein the SS burst set includes a plurality of SS bursts that include the more than one SS block.

Example 15 may include the one or more computer-readable media of example 11 and/or some other example herein, wherein to transmit the SS, the AN is to transmit the SS by forming one or more beams to include more than one SS block.

Example 16 may include an apparatus comprising: one or more baseband processors to measure, based on reception by the UE, at least one total power of an SS of a cell in a measurement bandwidth over a duration of a measurement window length; and a CPU coupled with the one or more baseband processors, the CPU to acquire the measurement window length, and calculate an RSSI, based on at least the one measured total power over the duration of the measurement window length.

Example 17 may include the apparatus of example 16 and/or some other example herein, wherein to calculate the RSSI, the CPU is to calculate, based on the at least one measured total power, a linear average power of the at least one measured total power over the duration of the measurement window length.

Example 18 may include the apparatus of examples 16-17 and/or some other example herein, wherein the duration of the measurement window length starts at a first slot of a first SS block in an SS burst set, and the first slot has the first SS block as an earliest SS block in the SS burst set.

Example 19 may include the apparatus of examples 16-17 and/or some other example herein, wherein the measurement bandwidth is a same bandwidth as used for a corresponding RSRP measurement of at least one SS to calculate a corresponding RSRQ of the at least one SS.

Example 20 may include the apparatus of examples 16-17 and/or some other example herein, wherein the measurement window length is calculated based on $T_{RSSI}=\text{Min }(5 \text{ ms}, 3.5 \times M \times L \times T_{ss\text{-}symbol})$, further wherein the M is a number of symbols in an SS block, the L is a maximum number of SS blocks in an SS burst set, and the $T_{ss\text{-}symbol}$ is a duration of the symbol.

Example 21 may include the apparatus of examples 16-17 and/or some other example herein, wherein the measurement bandwidth includes one or more bandwidths in which corresponding RSRP measurements are performed.

Example 22 may include the apparatus of examples 16-17 and/or some other example herein, wherein the at least one SS includes more than one SS block to indicate reference signal information from an AN, and the more than one SS block are to be transmitted by one or more transmit-beams formed by the AN.

Example 23 may include the apparatus of examples 16-17 and/or some other example herein, wherein the CPU is further to determine the measurement window length based on a configuration to indicate the measurement window length.

Example 24 may include the apparatus of example 23 and/or some other example herein, wherein the configuration to indicate the measurement window length is received via an RRC.

Example 25 may include the apparatus of examples 16-17 and/or some other example herein, wherein the one or more baseband processors are further to receive the SS in an SS burst or an SS burst set from an AN.

Example 26 may include an apparatus comprising a CPU to generate at least one SS of a cell and generate a message to indicate a configuration of a measurement window length; and one or more baseband processors to transmit the at least one SS of the cell and the message so that a UE is to measure an RSSI over a duration of the measurement window length, based on reception by the UE.

Example 27 may include the apparatus of example 26 and/or some other example herein, wherein the at least one SS of the cell includes more than one SS block to indicate reference signal information.

Example 28 may include the apparatus of example 27 and/or some other example herein, wherein the more than one SS block occupy more than one frequency range.

Example 29 may include the apparatus of examples 26-28 and/or some other example herein, wherein the message is further to indicate a periodicity of an SS burst set for transmission, further wherein the SS burst set includes a plurality of SS bursts that include the more than one SS block.

Example 30 may include the apparatus of example 26 and/or some other example herein, wherein to transmit the SS, an AN is to transmit the SS by forming one or more beams to include more than one SS block.

Example 31 may include a method comprising: acquiring or causing to acquire a measurement window length; and measuring or causing to measure, based on at least one SS of a cell received by a UE, an RSSI in a measurement bandwidth over a duration of the measurement window length.

Example 32 may include the method of example 31 and/or some other example herein, wherein measuring the RSSI comprises measuring or causing to measure, based on the at least one SS of the cell received by the UE, at least one total power of the at least one SS of the cell plus noise and interference in the measurement bandwidth over the duration of the measurement window length; and calculating or causing to calculate, based on the at least one measured total power, a linear average power of the at least one measured total power over the duration of the measurement window length.

Example 33 may include the method of examples 31-32 and/or some other example herein, wherein the duration of the measurement window length starts at a first slot of a first SS block in an SS burst set, and the first slot has the first SS block as an earliest SS block in the SS burst set.

Example 34 may include the method of examples 31-32 and/or some other example herein, wherein the measurement bandwidth is a same bandwidth as used for a corresponding RSRP measurement of the at least one SS to calculate a corresponding RSRQ of the at least one SS.

Example 35 may include the method of examples 31-32 and/or some other example herein, wherein the measurement window length is calculated based on $T_{RSSI}=\text{Min }(5 \text{ ms}, 3.5 \times M \times L \times T_{ss\text{-}symbol})$, further wherein the M is a number of symbols in an SS block, the L is a maximum number of SS blocks in an SS burst set, and the $T_{ss\text{-}symbol}$ is a duration of the symbol.

Example 36 may include the method of examples 31-32 and/or some other example herein, wherein the measurement bandwidth includes one or more bandwidths in which corresponding RSRP measurements are performed.

Example 37 may include the method of examples 31-32 and/or some other example herein, wherein the at least one SS includes more than one SS block to indicate reference signal information from an AN, and the more than one SS block are to be transmitted by one or more transmit-beams formed by the AN.

Example 38 may include the method of examples 31-32 and/or some other example herein, further comprising determining the measurement window length based on a configuration to indicate the measurement window length.

Example 39 may include the method of example 38 and/or some other example herein, further comprising receiving the configuration to indicate the measurement window length via an RRC by the AN.

Example 40 may include the method of examples 31-32 and/or some other example herein, further comprising receiving or causing to receive the SS in an SS burst or an SS burst set from an AN.

Example 41 may include a method comprising: generating or causing to generate at least one SS of a cell; generating or causing to generate a message to indicate a configuration of a measurement window length; and transmitting or causing to transmit the at least one SS of the cell and the message so that a UE is to measure an RSSI over a duration of the measurement window length, based on reception by the UE.

Example 42 may include the method of example 41 and/or some other example herein, wherein the at least one SS of the cell includes more than one SS block to indicate reference signal information.

Example 43 may include the method of example 42 and/or some other example herein, wherein the more than one SS block occupy more than one frequency range.

Example 44 may include the method of examples 41-43 and/or some other example herein, wherein the message is further to indicate a periodicity of an SS burst set for transmission, further wherein the SS burst set includes a plurality of SS bursts that include the more than one SS block.

Example 45 may include the method of example 41 and/or some other example herein, wherein transmitting or causing to transmit the SS is transmitting or causing to transmit the SS by forming one or more beams to include the more than one SS block.

Example 46 may include an apparatus comprising means to perform one or more elements of a method described in or related to any of examples 31-45, or any other method or process described herein.

Example 47 may include one or more non-transitory computer-readable media comprising instructions to cause an electronic device, upon execution of the instructions by one or more processors of the electronic device, to perform one or more elements of a method described in or related to any of examples 31-45, or any other method or process described herein.

Example 48 may include an apparatus comprising logic, modules, and/or circuitry to perform one or more elements of a method described in or related to any of examples 31-45, or any other method or process described herein.

Example 49 may include a method, technique, or process as described in or related to any of examples 31-45, or portions or parts thereof.

Example 50 may include an apparatus comprising: one or more processors and one or more computer-readable media comprising instructions that, when executed by the one or more processors, cause the one or more processors to perform the method, technique, or process as described in or related to any of examples 31-45, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. An apparatus of baseband circuitry of an access node (AN), comprising:
    means for generating a synchronization signal (SS) of a cell;
    means for transmitting the SS of the cell to a user equipment (UE);
    means for generating a message to indicate a configuration of a measurement window length; and
    means for transmitting the message to indicate the configuration of the measurement window length to enable the UE is to measure a received signal strength indicator (RSSI) over a duration of the measurement window length, wherein the measurement window length indicates a measurement time for the UE to measure the RSSI including measurement of all orthogonal frequency division multiplexing (OFDM) symbols containing consecutive reference symbols located in a SS block of multiple SS blocks of a SS burst included in a slot in a downlink part of measurement subframes.

2. The apparatus of claim 1, wherein the means for transmitting the message is further to transmit the message via a radio resource control.

3. The apparatus of claim 1, wherein the SS of the cell includes more than one SS block to indicate reference signal information regarding the cell.

* * * * *